Nov. 27, 1923. 1,475,510
C. L. RAGOT ET AL
COOLING SYSTEM FOR ROTARY INTERNAL COMBUSTION ENGINES
Filed Sept. 26, 1919. 6 Sheets-Sheet 3
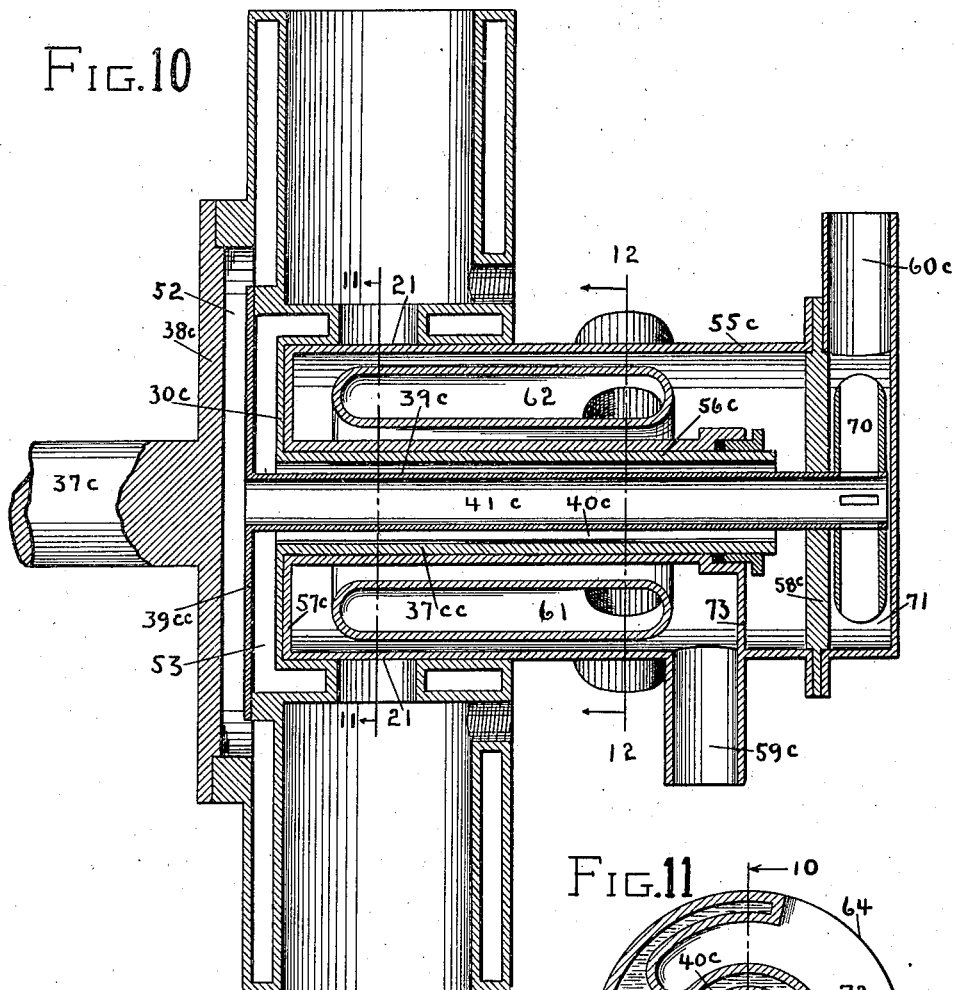
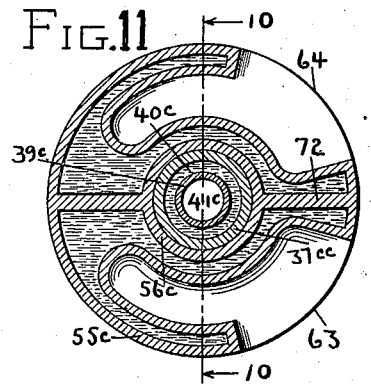
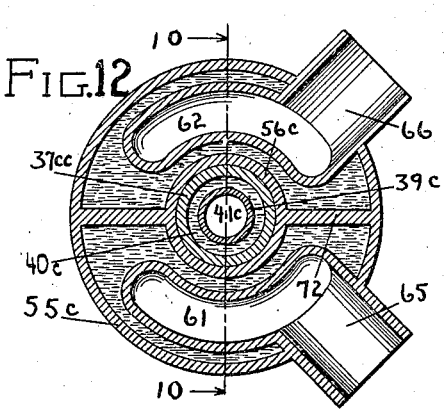
INVENTORS.
Charles L. Ragot
Louis F. Ragot
BY
ATTORNEY.

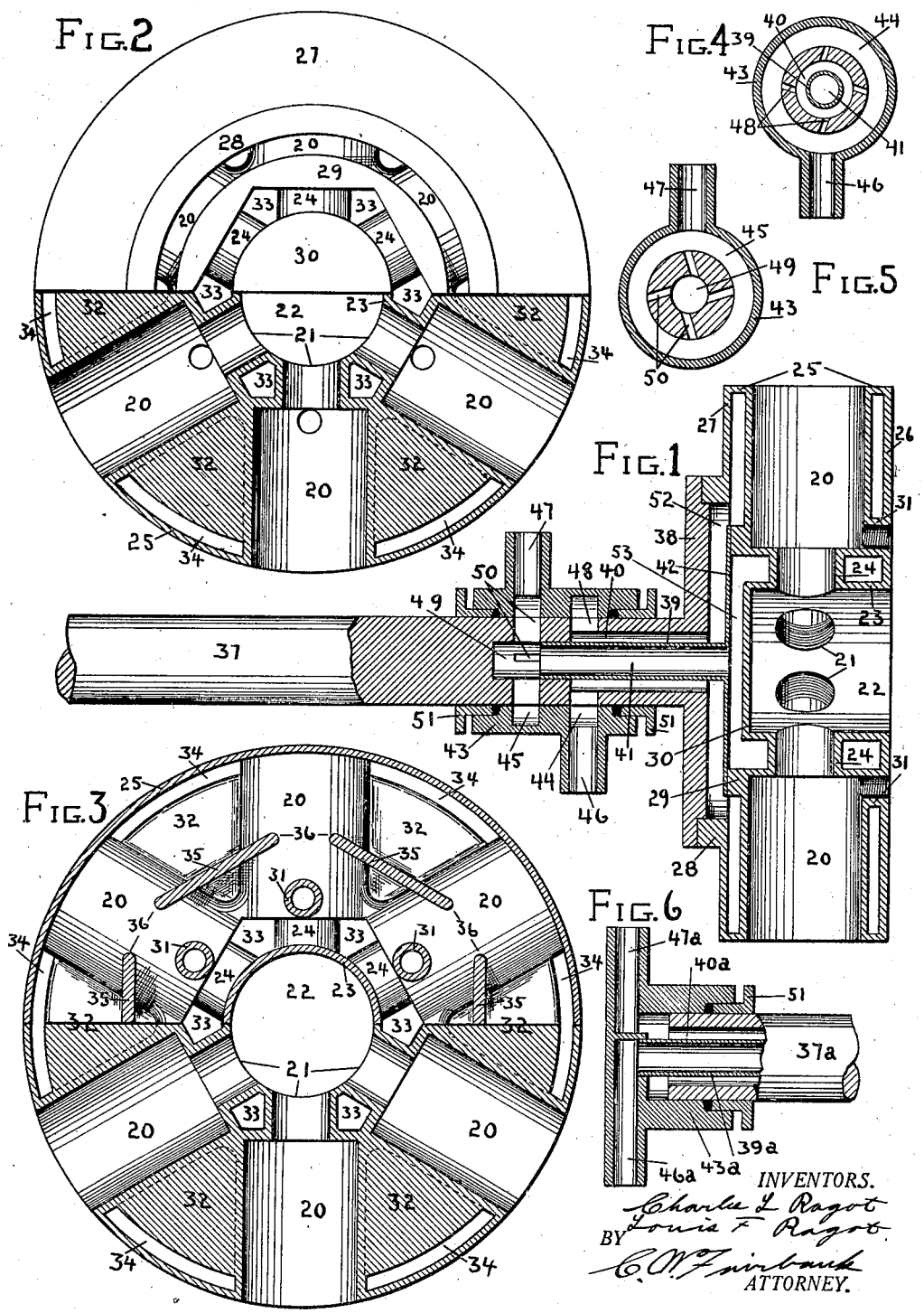

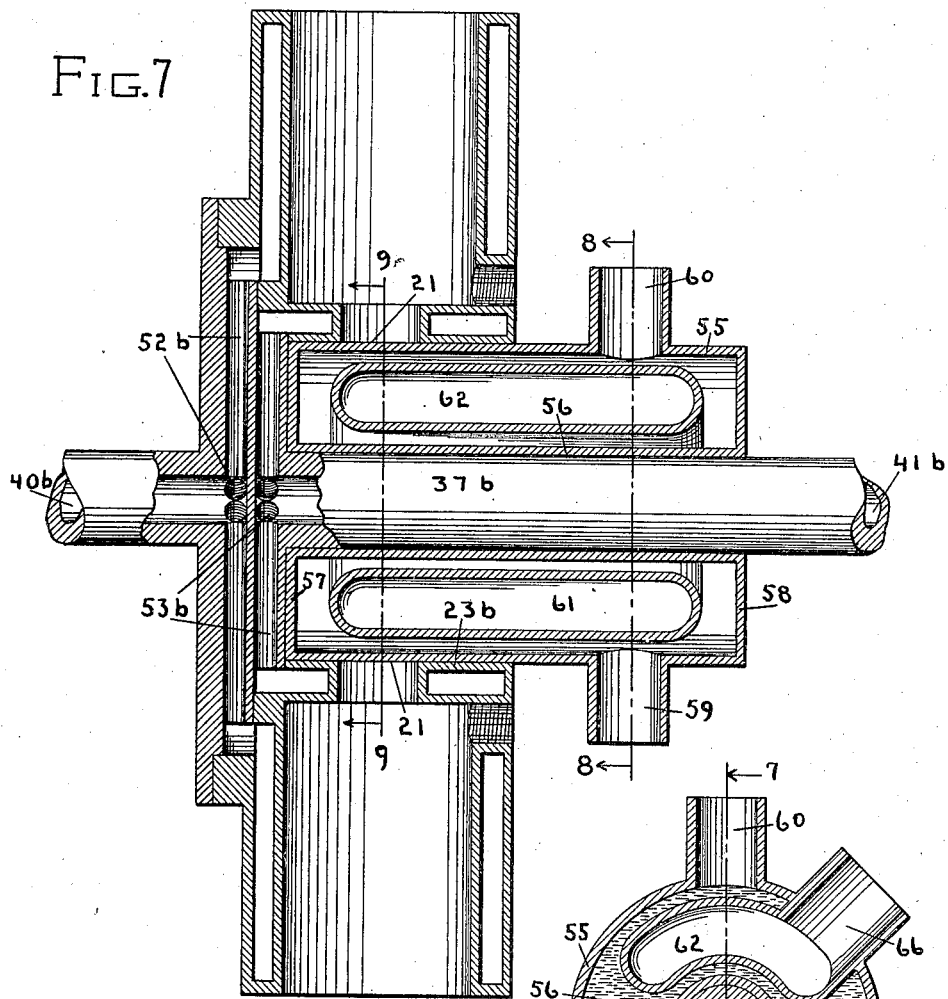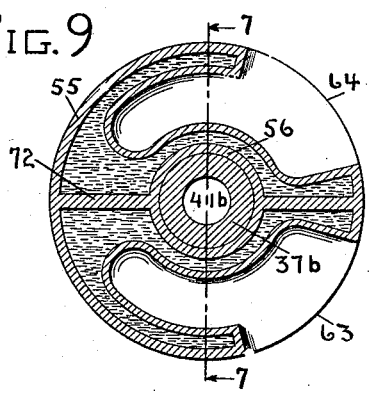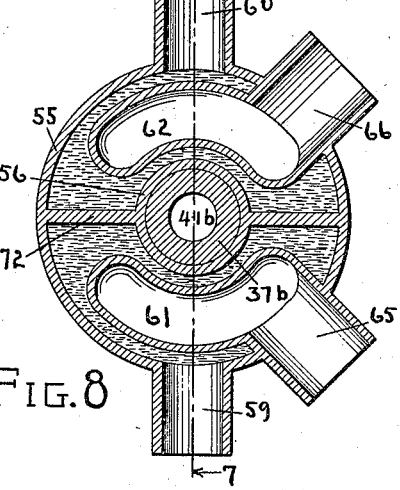

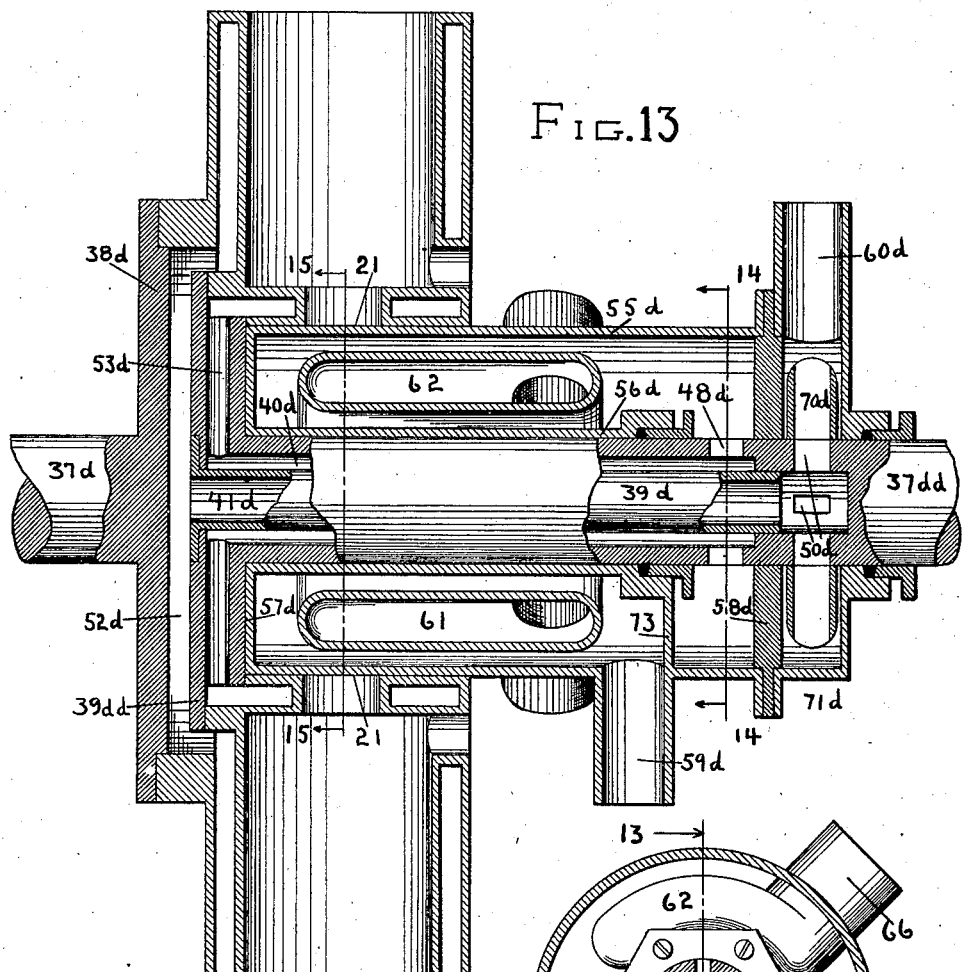
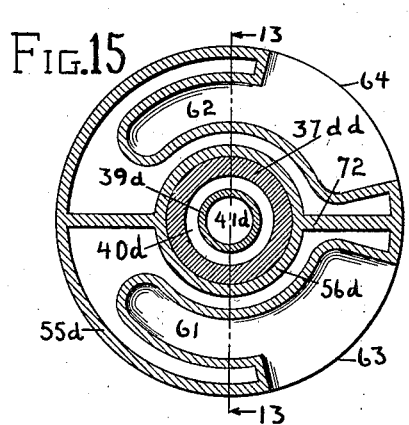
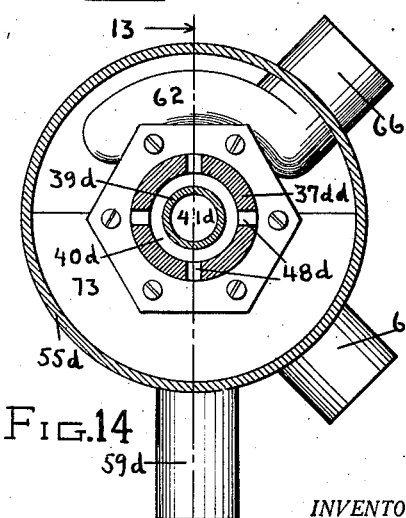

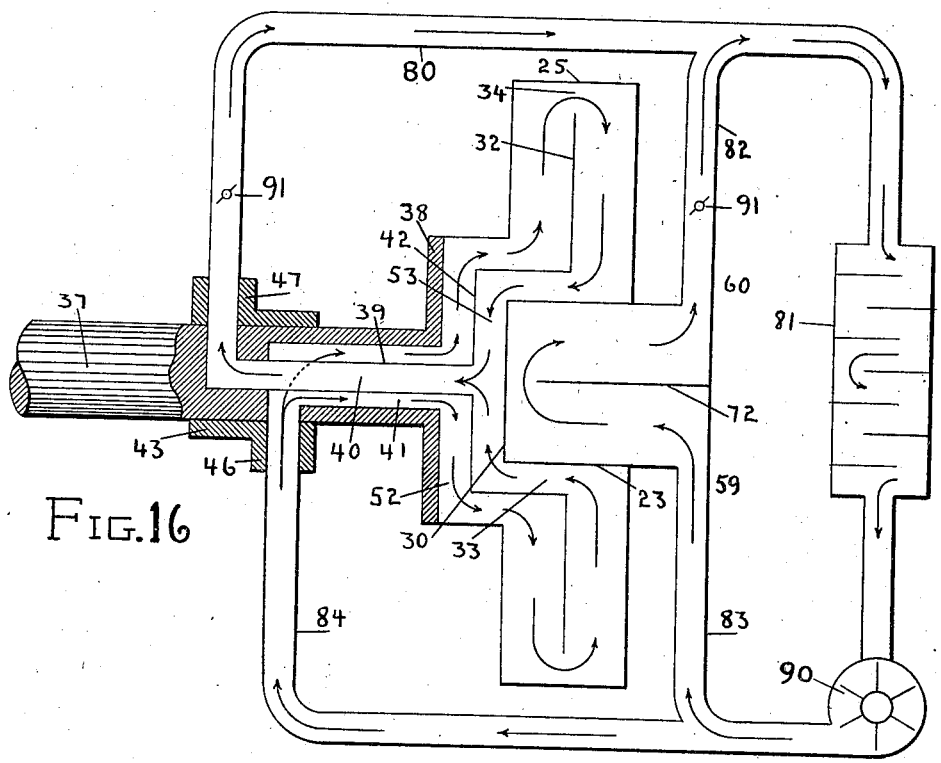
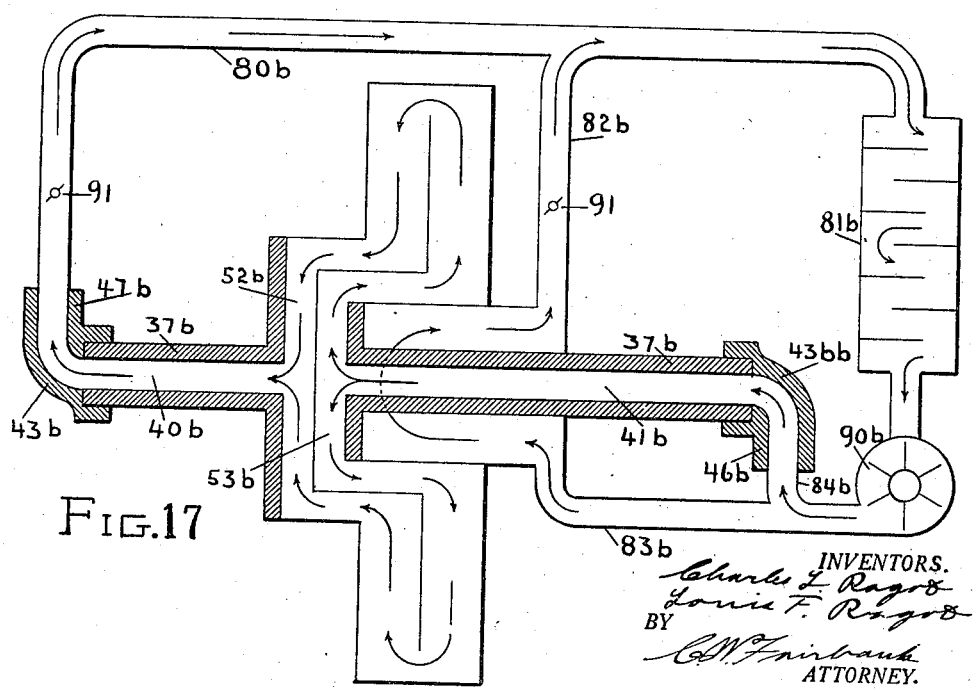

Nov. 27, 1923

C. L. RAGOT ET AL 1,475,510

COOLING SYSTEM FOR ROTARY INTERNAL COMBUSTION ENGINES

Filed Sept. 26, 1919  6 Sheets-Sheet 6

INVENTORS
Charles L. Ragot
Louis F. Ragot
BY
C. W. Fairbank
ATTORNEY.

Patented Nov. 27, 1923.

1,475,510

UNITED STATES PATENT OFFICE.

CHARLES L. RAGOT, OF KINGSBRIDGE, NEW YORK, AND LOUIS F. RAGOT, OF MILFORD, PENNSYLVANIA, ASSIGNORS TO RAGOT MOTOR CORPORATION, A CORPORATION OF NEW YORK.

COOLING SYSTEM FOR ROTARY INTERNAL-COMBUSTION ENGINES.

Application filed September 26, 1919. Serial No. 326,533.

*To all whom it may concern:*

Be it known that we, CHARLES L. RAGOT, a citizen of the United States, and a resident of Kingsbridge, New York city, in the county of New York and State of New York, and LOUIS F. RAGOT, also a citizen of the United States, and a resident of Milford, in the county of Pike and State of Pennsylvania, have invented certain new and useful Improvements in a Cooling System for Rotary Internal-Combustion Engines, of which the following is a specification.

This invention relates to cooling systems for rotary internal combustion engines of that type in which the cylinders are arranged radially in respect to and rotatable about the axis of the engine and in which the pistons react against a track encircling the axis of the engine at varying distances therefrom to effect the desired reciprocation of the pistons during the rotation of the cylinders and pistons. An engine of this general type is disclosed in our prior Patent No. 1,088,623 issued February 24, 1914 and our present invention is an improvement on the cooling system there disclosed.

The main object of our invention is to provide a continuous circuit for the cooling medium so as to effectively direct said medium to all parts requiring to be cooled. A further important feature involves the construction and arrangement whereby the cooling fluid may be delivered from and returned to stationary conduits but continuously circulated through the rotor. As shown in two forms of our invention, a further object is to so divide the cooling circuit that the rotating parts will have a circuit independent from the circuit which cools the stationary distributor. Both of these circuits may be supplied from a common pump drawing water from the radiator into which both circuits discharge their water after having been heated. The advantage thus gained is twofold. The supply pipe of these circuits can be of such capacity so as to carry an amount of cooling medium for the particular parts intended to be cooled in proportion to the areas and temperatures of such parts and furthermore, means for controlling the outlet of said cooling medium either manually or thermally may be introduced in said outlets in order to maintain more nearly equal temperatures of the parts which are in rotary contact with each other so that their expansion due to the combustion may be more nearly equal. Other objects and advantages will be apparent from the following description of certain embodiments of our invention.

In the accompanying drawings we have not illustrated the pistons, the track with which they engage, the frame, and various other parts essential to a complete operative device, as such parts form no portion of our invention and may be constructed as shown in our prior patent above referred to or some of them may be constructed as illustrated in our prior Patent 1,302,709 issued May 6, 1919.

In these drawings:—

Figure 1 is a central longitudinal section through the body portion of the rotor of an engine constructed in accordance with one embodiment of our invention and showing the conduit connections to the inlet and outlet for the cooling fluid.

Figure 2 shows in the upper half thereof, an end view of the parts shown in Figure 1 and in the lower part, a central longitudinal section in the plane of the axes of the cylinders.

Figure 3 is a section on the line 3—3 of Figure 1, looking from the end opposite to Figure 2.

Figure 18:
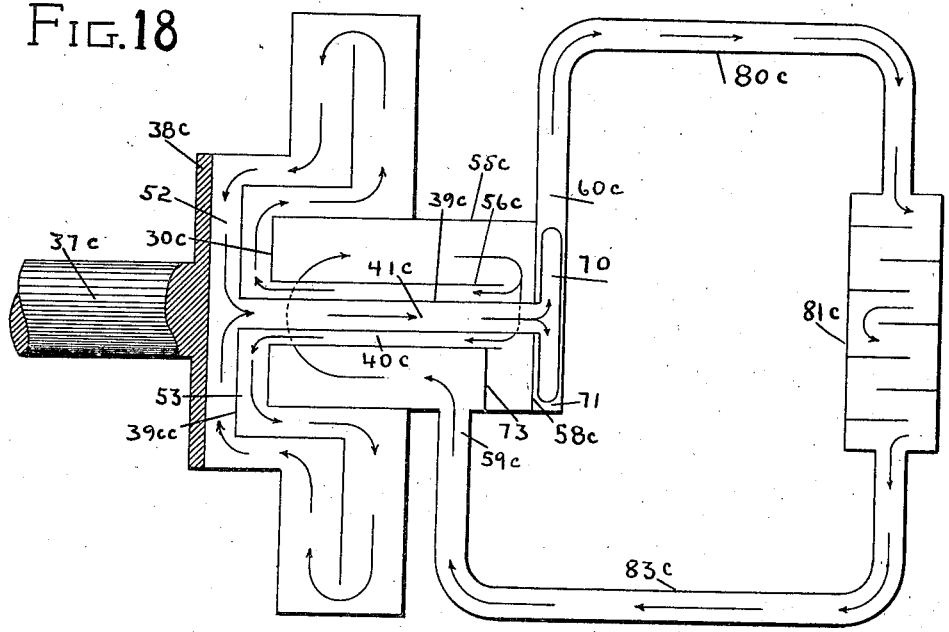

Figures 4 and 5 are transverse sections on the lines 4—4 and 5—5 respectively of Figure 1.

Figure 6 is a section similar to a portion of Figure 1 but showing a modified form.

Figure 7 is a view somewhat similar to Figure 1, but showing a modified construction and also showing cooling means for the motive fluid distributor.

Figures 8 and 9 are transverse sections on the lines 8—8 and 9—9 respectively of Figure 7.

Figure 10 is a view similar to Figure 7 but showing a further modified form.

Figures 11 and 12 are transverse sections on the lines 11—11 and 12—12 respectively of Figure 10.

Figure 13 is a view similar to Figure 7 but showing a further modified form.

Figures 14 and 15 are transverse sections of the rotor on the lines 14—14 and 15—15 respectively of Figure 13, and Figures 16, 17, 18, and 19 are diagrammatic views of cooling fluid circulating systems as embodied in Sheets 1, 2, 3, and 4.

In the specific construction illustrated in Sheet 1, the rotor has a plurality of radially disposed cylinders 20 having their axes in the same transverse plane and at right angles to the axis of rotation of the rotor. Each cylinder is open at its outer end so as to receive the piston, not shown, and at its inner end has a cylinder port 21 for the admission and escape of motive fluid. All of these ports 21 lead to a chamber 22 for a distributor, not illustrated. This distributor may be normally stationary and have supply and exhaust conduits which come into registry with the cylinder ports 21 at the proper time during the rotation of the rotor so as to deliver motive fluid to the cylinders and permit of the escape of the exhaust gas. The cylinders may be cast integral with each other and with the sleeve or tubular member 23 which encircles the distributor chamber 22 and also integral with chambers 24 through which the cylinder ports 21 extend. The cylinders are also shown as being connected and braced by a cylindrical peripheral wall 25 through which the outer ends of the cylinders open and by a pair of annular parallel walls 26 and 27 spaced from the cylinders upon opposite sides. These walls at their outer edges are united with and preferably integral with the peripheral wall 25 while the inner edge of one of the walls, for instance, the wall 26 may be secured to or formed integral with the wall 23 encircling the distributor chamber. The other end wall 27 of the rotor may have an annular flange 28 of somewhat larger diameter and extending axially to a slightly greater distance than a somewhat similar annular flange 29 connecting the cylinders at their inners ends. This flange is somewhat larger and projects axially to a slightly greater distance than the inner end of the distributor chamber which may be closed by an end wall 30. All of these parts of the rotor may be of a single casting and they may also be formed integral with the bosses 31 connecting the inner ends of the cylinders with the end wall 26 and providing passages to receive the spark plugs or other igniting means. Midway between the end walls 26 and 27, partition walls 32 may be employed extending weblike to the inner ends of the cylinders. They do not extend to the wall 23 of the distributor casing and thus they leave axial passages 33 between the cylinder conduits 24. Their outer edges are spaced from the peripheral wall 25 so as to leave passages 34. The construction may be further braced and the flow of fluid controlled by baffle plates 35 extending all of the way from one end wall 26 to the other end wall 27 and approximately circumferentially between the cylinders. These baffle plates are spaced apart at points opposite each cylinder to leave gaps 36 as indicated particularly in Figure 3.

For mounting the rotor and transmitting power therefrom, there is provided a shaft 37 having an outwardly extending flange or end wall 38 secured to the flange 28 of the rotor. The shaft is hollow at one end and within this end there is a tube 39 spaced therefrom to leave an annular passage 40 separate from the passage 41 within the tube. The tube is provided with an upwardly extending flange or diaphragm 42 parallel to the end wall 38 but spaced therefrom and having its periphery rigidly secured to the flange 29 of the rotor.

Encircling the shaft is a non-rotatable casing 43 provided with two annular chambers 44 and 45 communicating with supply and outlet conduits 46 and 47. The annular passage 44 communicates by ports 48 with the annular passage 40 while the chamber 45 communicates through ports 50 with the chamber 49 within the shaft at the end of the tube 39. These ports are preferably set somewhat tangentially as illustrated in Figures 4 and 5, the ports 50 being inclined in one direction and the ports 48 in the other, so that the rotation of the shaft will tend to draw in fluid from one annular passage of the chamber 43 and force liquid out through the other set of ports to the other annular chamber. The direction of flow will depend upon the direction of rotation of the shaft. Assuming that the cooling fluid enters the passage 46, it will flow around annular passage 44 and through ports 48 to the annular passage 40 which communicates with radiating passage 52 between parallel walls 38 and 42, through which it flows until it reaches peripheral wall 25 of the rotor.

During this movement, it will be subdivided and caused to flow along the sides of the cylinders guided by partition walls 32 and through gaps 36 by reason of baffles 35. The liquid, on reaching the peripheral wall 25, will flow axially through openings 34 to the opposite side of the partition walls 32 and thence radially inward along the cylinders and being diverted by baffles 35 will flow through gaps 36, around the spark plug bosses 31 until it reaches the distributor chamber wall 23, then axially in the opposite direction through the passages 33 to circular passage 53 between the parallel walls 42 and 30, through passage 41 of tube 39, through ports 50 to annular passage 45 and to the outlet conduit 47. It will be noted that the cooling liquid is thus brought into proper contact with all of the parts to be cooled, stay pockets are substantially eliminated, and a continuous circulation of the cooling medium may be maintained through the rotor during the rotation of the latter. The circulation may be automatically maintained solely by the scooping action of the diagonal ports 48 and 50 or the circulation may be automatically maintained through a cooling chamber as a thermocycle or the circulation may be obtained by any desired form of force pump.

It should be noted that in the present forms of thermocycle cooling systems as used in the stationary or non-rotary engines, the action of gravitation is employed on the cooling fluid. The warmed water, having less density, will rise and the cooled water, having more density, will flow downward and by providing a supply conduit for cooled water at the lowermost portion of the water jacket and an outlet conduit for the warmed water at the uppermost portion of the water jacket, an automatic circulation will take place if the circuit is completed through a radiator and kept full of water, and the only force which keeps the water in motion is the difference in actual weight of a column of water in the radiator and the weight of a similar column of water in the motor.

In the engines of the type as described in this and our former patents, if a thermocycle system is used, we employ the action of centrifugal force on the water within the rotor. Having a confined circuit through which the water must flow, and as the supply of cooled water is admitted at or near the center of the rotor, this cooled water having more density will be forced radially outward with more force than any warmed water which of course has less density and as there is an outlet for the warmed water at the other end of the water circuit located also at or near the center of the rotor, an automatic circulation will be established. The centrifugal action on the water in our rotor is many times as great as the gravital action on the water in the stationary or non-rotary motors as described above.

The arrangement of annular chambers 44 and 45 with the ports 48 and 50 may be conveniently employed where it is desired to deliver and return the cooling medium at a point intermediate of the ends of the shaft. If it is convenient to deliver and receive the medium at the end of the shaft, we may arrange the parts as shown in Figure 6. Here the casing 43$^a$ is on the end of the shaft and has a passage 46$^a$ communicating with the inner tube 39$^a$ and a passage 47$^a$ communicating with the annular space 40$^a$ between the tube and the outer wall of the shaft 37$^a$. With the casings shown in Figures 1 and 6, suitable packing glands 51 may be employed upon the shaft for preventing leakage of the cooling liquid.

In the form above described it will be noted that the cooling medium is delivered to and received from the same end of the engine and that the main rotor of the engine is supported by a shaft extending in only one direction from the body of the rotor. In Figure 7 we have illustrated a construction in which the rotor is supported intermediate of the ends of the shaft and the supply of motive fluid to and from the circulatory path of the rotor is from opposite ends. This construction differs from that above described in that the shaft 37$^b$ has a portion projecting through the distributor chamber and co-axial with but spaced from the wall 23$^b$. The parts corresponding to the walls 30, 42, and 38 may be formed as a part of the shaft and carried thereby and radial passages 52$^b$ and 53$^b$ may be formed to serve the purpose of the circular passages 52 and 53 as shown in Figure 1. The cooling fluid may enter the passage 41$^b$ in one end of the shaft and flow out radially through passages 53$^b$ and around the cylinders in the same manner as previously described but in this instance, it is in the reverse direction, and back through the passages 52$^b$ to the passage 40$^b$ in the other end portion of the shaft. It will be understood that a stationary casing similar to those shown in Figures 1 and 6 should be employed at each end of the shaft to which connecting conduits may be attached but these however form no part of our invention.

In connection with the form of rotor shown in Figure 7, we have illustrated a motive fluid distributor also having a circuitous path for cooling medium. The distributor includes outer and inner peripheral walls 55 and 56, the former having a close fit within the wall 23$^b$ and the latter encircling the shaft 37$^b$. The distributor also has inner and outer end walls 57 and 58 forming a closed annular chamber with diametrically opposite cooling fluid supply and outlet conduits 59 and 60. The water chamber has a longitudinally extending horizontal transverse partition 72 extending lengthwise thereof, the inner end being spaced a short distance from the inner end wall 57 and the outer end being integral with outer end wall 58. This partition 72 serves as a baffle plate to divert the flow of cooling fluid to form a roundabout path to cool the distributor instead of a direct one from supply conduit 59 to outlet conduit 60. Within this annular water jacket are formed a pair of longitudinally extending conduits 61 and 62 provided with ports 63 and 64 at their inner ends, which may register with the cylinder ports 21 and provided with gas inlet and exhaust conduits 65 and 66, at their outer ends. The motive fluid may enter the inlet conduit 65 and flow through the passage 61 to the port 63 and enter a cylinder through its port 21 during the first one-quarter of a revolution of the rotor. During the next one-quarter revolution, the motive fluid may be compressed and then ignited and expanded during the next one-quarter revolution. By this time the cylinder port 21 will have reached the exhaust port 64 and the gas may escape through the passages 62 and 66. It will of course be understood that the track with which the pistons engage is so constructed as to give two instrokes and two outstrokes of each piston during each complete revolution of the rotor. An elliptical track of the character shown in our patents above referred to is suitable for this purpose.

In the specific form shown in Sheet 3, the water circulatory system differs from that previously described, primarily in that the inlet and outlet are on the same side of the rotor as the distributor whereas in the form shown in Sheet 1 both inlet and outlet are on the opposite side, and in the form shown in Sheet 2, the inlet is on one side and the outlet on the other. The rotor shown in Figure 10 is substantially the same as that shown in Figure 1 except that the shaft $37^c$ is solid, as is also the flange $38^c$. The diaphragm $39^{cc}$ has a central aperture the same as in Figure 1 but the tube $39^c$ leads in the opposite direction therefrom. The end wall $30^c$ of the distributor chamber has a central aperture receiving and spaced from the tube $39^c$ and connected to a tube $37^{cc}$. The tube $39^c$ provides a passage $41^c$ communicating with the radial chamber 52 while the space between the tube $39^c$ and $37^{cc}$ forms a passage $40^c$ communicating with the radial chamber 53. The flow from the passage $41^c$ around the cylinder and back to the passage $40^c$ is substantially the same as the flow from the passage 41 of Figure 1 back to the passage 40.

Encircling the tube $37^{cc}$ is an annular chamber similar in some respects to that shown in Figures 7, 8, and 9. This chamber has an outer peripheral wall $55^c$, an inner peripheral wall $56^c$, and inner and outer end walls $57^c$ and $58^c$. Both the inner cylindrical wall $56^c$ and the tube $37^c$ are spaced from the end wall $58^c$ so that the passage $40^c$ may communicate directly with the interior of this chamber. The tube $39^c$ extends through the end wall $58^c$ and is provided with a centrifugal pump 70, in an end compartment 71, the interior of the tube communicating with the rotor of the pump so that the water will be drawn through the tube and forced outwardly through the rotor of the pump and to an outlet $60^c$. The water chamber has a longitudinally extending horizontal transverse partition 72 extending lengthwise thereof as in Figure 7, the inner end being spaced a short distance from the inner end wall $57^c$ and the outer end being connected with a semi-circular transverse wall 73. The inlet $59^c$ for the water may lead to the chamber at the inner side of this partition 73. The flow of water may be substantially as follows: in through inlet $59^c$, to the left in the lower half of the chamber below the partition 72 to the inner end of the latter, around the inner end of the partition to the upper half of the compartment, then to the right and in the open end of the tube $37^{cc}$, thence to the left to the radial chamber 53, around the cylinders as described in connection with Figure 1, back to the chamber 52, thence to the right through passage $41^c$ to the centrifugal pump 70 and out through the outlet $60^c$. The water chamber may have the same form of gas inlet and exhaust passages 61 and 62, ports 63 and 64, and inlets and outlets 65 and 66 as shown on Sheet 2.

On Sheet 4 we have shown a form which has certain features in common with the construction shown in Sheet 2 and also certain features in common with that shown on Sheet 3. The general operation of the device shown in Figure 13 is substantially the same as that shown in Figure 10 although the rotor is supported intermediate of the ends of the shaft instead of upon one end. The shaft section $37^d$ has a transverse wall $38^d$ while a shaft section $37^{dd}$ has a transverse wall $39^d$ spaced from the first mentioned wall to leave a chamber $52^d$. The wall $39^{dd}$ has radial passages $53^d$ bored therein. The shaft section $37^{dd}$ has an axially disposed passage $40^d$ and inside of this is a central tube $39^d$ presenting a passage $41^d$. The latter extends through the wall $39^d$ to the passage $52^d$ while the annular passage $40^d$ communicates with the radial passages $53^d$. The shaft has transverse ports $48^d$ communicating with the water chamber while the tube $39^d$ has ports $50^d$ leading to the interior of the centrifugal pump $70^d$. The parts $55^d$, $56^d$, $57^d$, $58^d$, $59^d$, $60^d$, of the water chamber are substantially the same as those shown in Figures 10, 11, and 12 and have been designated by the same reference characters except for the exponents "d" instead of "c." The distributor parts for the incoming and outgoing gases are the same in structure and are designated by the same reference characters as those shown in Figures 10, 11, and 12. It is thought that a detailed description of the operation of this form is not necessary.

In Figures 16, 17, 18 and 19, we have diagrammatically indicated the different embodiments of our invention showing the constructions detailed in Sheets 1, 2, 3, and 4 respectively and have employed corresponding reference characters to indicate the parts shown in the preceding figures, and the water circuits are indicated by arrows.

In Figures 16 and 17 the cooling fluid circuits are divided into two branches, one for the rotor and one for the distributor.

In Figure 16 the shaft protrudes from only one side of the rotor while in Figure 17, the shaft projects through the distributor and beyond it, forming a double mounting for the rotor. In Figure 16, the cooling fluid may be conducted from the outlet 47 through a pipe 80 to the radiator 81 and a separate branch of the cooling liquid may flow from the outlet 60 of the distributor casing through pipe 82 either directly to the radiator or to the pipe 80. From the radiator, the water may be forced by pump 90 through pipes 83 and 84 to the water inlet 59 of the distributor and water inlet 46 of the rotor.

In Figure 17, the cooling fluid may be conducted from the outlet $47^b$ through a pipe $80^b$ to the radiator $81^b$ and a separate branch of the cooling liquid may flow from the outlet $60^b$ of the distributor casing through pipe $82^b$ either directly to the radiator or to the pipe $80^b$. From the radiator, the water may be forced by pump $90^b$ through pipes $83^b$ and $84^b$ to the water inlet $59^b$ of the distributor and water inlet $46^b$ of the rotor. On its way to the radiator, the warmed water in both Figures 16 and 17 must pass through valves 91 near the outlets of the rotor and distributor. This valve is to control the flow and consequently the temperature of the cooling fluid in either the rotor or the distributor or both and may be adapted to be controlled either manually or thermally in which case it would tend to automatically maintain a given temperature in each half of the system, each half not necessarily being the same as the other. The divided water cooling systems here shown, one for the rotor and one for the distributor, permit of a differential cooling system whereby the excessive heat at the joint where these two members are in rotary contact may be carried off in proportion to the amount of heat they receive individually.

Figure 19:
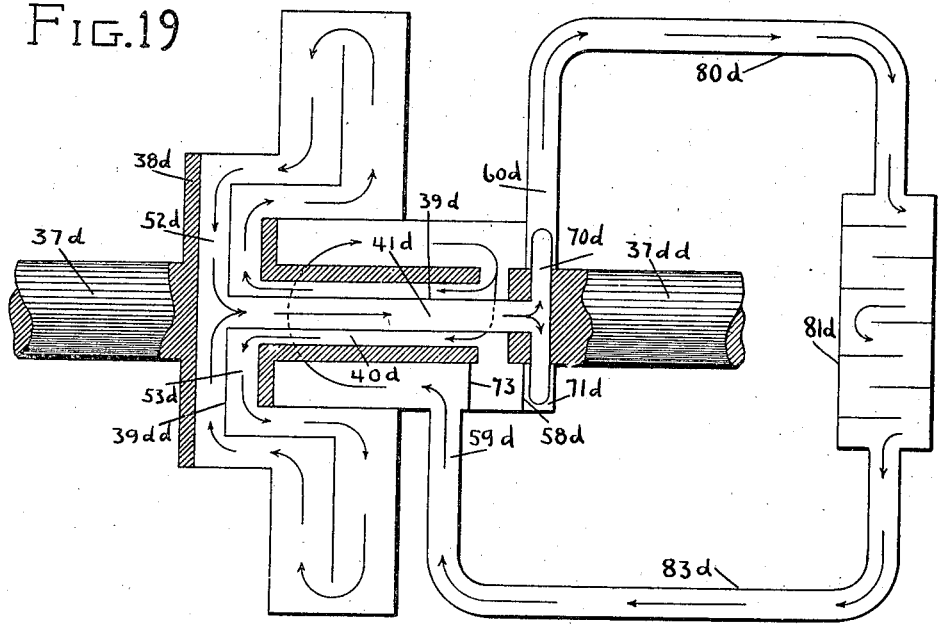

Figures 18 and 19 show circulatory systems for the cooling fluid in which all of the parts to be cooled are included in one continuous passage, both inlet and outlet of the systems being in the stationary distributor which is also provided with a centrifugal pump driven by the rotor. In Figure 18, the cooling fluid may be led from the radiator $81^c$ through pipe $83^c$ to inlet $59^c$ of the distributor, from which it starts its circuit through the whole system and out through outlet $60^c$ to pipe $80^c$ and back to the radiator.

In Figure 19, the outer circuit is substantially the same as in Figure 18, and the shaft in this case projects through the distributor and beyond it as in Figure 17, permitting of a bearing mounting on each side of the rotor. The circulation in Figures 18 and 19 is maintained by the action of centrifugal pumps $70^c$ and $70^d$ respectively, driven by the rotors.

Having thus described our invention what we claim as new and desire to secure by Letters Patent is:—

1. An internal combustion engine having a plurality of radially disposed cylinders rotatable about a common axis, a shaft supporting and carrying said cylinders, a water jacket encircling the group of cylinders, a cylindrical wall spaced from the inner heads of said cylinders and extending axially of the group of cylinders along substantially the entire cylinder diameter, and forming with the cylinder heads an annular chamber, separate radially extending axially spaced passages at one end of said cylindrical wall, one of said passages being connected directly to one end of said water jacket and the other connected to one end of said annular chamber, the opposite end of said chamber being directly connected to the other end of said water jacket, means for supplying cooling liquid to one of the said passages, and means for withdrawing said liquid from the other.

2. A rotary internal combustion engine having a plurality of radially disposed cylinders, a motive fluid distributor, receiving chamber coaxial with the group of cylinders and extending axially across the plane of the axes of the cylinders, the peripheral wall of said chamber being spaced from the inner cylinder heads, a water jacket encircling the group of cylinders and communicating with one end of the annular space, and inlet and outlet passages one communicating with the other end of the space and the other communicating with said water jacket.

3. A construction as defined in claim 2, and in which there is a web between the cylinders in the plane of their axes, and spaced from the outer wall of the water jacket.

4. An internal combustion engine including a plurality of radially disposed cylinders, a motive fluid distributor receiving chamber co-axial with the group of cylinders and spaced from the inner cylinder heads to leave an annular chamber, passages extending from each cylinder head across said annular space to said chamber, a water jacket encircling said cylinders and having a web in the plane of the cylinders and spaced from the outer peripheral wall of the water jacket, and transverse baffles within said water jacket and spaced apart circumferentially at points radially registering with said passages, and means for circulating cooling water lengthwise on said annular space, between said first mentioned passages and outward radially between said baffles and axially past the outer edge of said web.

5. A construction as defined in claim 4, in which there are inlet and outlet conduits arranged co-axial with the engine, one of said conduits being connected with one end of said annular space and the other communicating with said jacket at the side thereof, opposite to the side at which said annular space communicates with said jacket.

6. An internal combustion engine including a rotatable part and a stationary part, said parts having contacting walls, separate cooling fluid circulating passages on the outer surfaces of both of said walls, and means for varying the relative quantities of cooling liquid delivered to said passages.

7. An internal combustion engine, including a plurality of radially disposed cylinders rotatable about a common axis and having water cooling passages, a stationary motive fluid distributor having separate water cooling passages, a water circulating device, and means for varying the relative amount of cooling water delivered from said device to said first mentioned and said second mentioned passages.

9. An internal combustion engine, having a rotor including a plurality of radially disposed cylinders rotatable about a common axis and having a centrally disposed chamber, a stationary motive fluid distributor projecting into said chamber, and means for circulating cooling fluid through said rotor and said distributor.

9. An internal combustion engine, having a rotor including a plurality of radially disposed cylinders rotatable about a common axis and having a centrally disposed chamber, a stationary motive fluid distributor projecting into said chamber, and means for circulating cooling fluid through said rotor and said distributor upon opposite surfaces of the inter-engaging walls in said chamber.

10. In an internal combustion engine a plurality of radially disposed cylinders rotatable about a common axis, a water jacket for said cylinders and rotatable therewith, and a pair of passages extending axially of the engine and connected to said jacket, one of said passages having a rotatable part at its outer end with water passages each having a radial component causing centrifugal force to act on the water in said last mentioned passages and thereby force a circulation of water through said first mentioned passages and said jacket during the rotation of the engine.

11. An internal combustion engine including a plurality of radially disposed cylinders rotatable about a common axis and having water cooling passages rigid with said cylinders, a stationary motive fluid distributor having motive fluid passages and cooling water passages, said motive fluid passages having ports adapted to directly register with similar ports of the cylinder heads and the cooling water passages of said distributor being independent of the water cooling passages of said cylinder.

12. An internal combustion engine including two relatively rotatable parts, one comprising a rotor having a plurality of cylinders radially disposed about a common axis and a centrally disposed chamber, and the other of said parts comprising a motive fluid distributor projecting into said chamber, said parts having interengaging walls in said chamber, and means for circulating cooling fluid through said rotor and distributor upon opposite surfaces of said interengageable walls.

Signed at New York, in the county of New York, and State of New York, this 20 day of Sept., 1919.

CHAS. L. RAGOT.
LOUIS F. RAGOT.